United States Patent
Miao

(10) Patent No.: US 10,466,744 B2
(45) Date of Patent: Nov. 5, 2019

(54) ELECTRONIC SYSTEM, ELECTRONIC DEVICE AND METHOD FOR SETTING EXTENDING SCREEN THEREOF, AND PROJECTOR APPARATUS

(71) Applicant: Wistron Corporation, New Taipei (TW)

(72) Inventor: Pen-Tai Miao, New Taipei (TW)

(73) Assignee: Wistron Corporation, New Taipei (TW)

( * ) Notice: Subject to any disclaimer, the term of this patent is extended or adjusted under 35 U.S.C. 154(b) by 133 days.

(21) Appl. No.: 15/436,766

(22) Filed: Feb. 18, 2017

(65) Prior Publication Data

US 2018/0107249 A1    Apr. 19, 2018

(30) Foreign Application Priority Data

Oct. 17, 2016    (TW) .............................. 105133391 A

(51) Int. Cl.
*G06F 1/16*     (2006.01)
*G06F 3/02*     (2006.01)
(Continued)

(52) U.S. Cl.
CPC .......... *G06F 1/1639* (2013.01); *G06F 3/0202* (2013.01); *G06F 3/1423* (2013.01); *G06F 3/1446* (2013.01); *G09G 5/006* (2013.01); *G09G 5/14* (2013.01); *G09G 5/38* (2013.01); *G03B 21/142* (2013.01); *G06F 3/0486* (2013.01); *G09G 2340/0464* (2013.01); *G09G 2354/00* (2013.01)

(58) Field of Classification Search
CPC .... G06F 1/1639; G06F 1/1601; G06F 3/1423; G06F 3/1446; G09G 5/006

USPC ......................................................... 345/184
See application file for complete search history.

(56) References Cited

U.S. PATENT DOCUMENTS 8,284,549 B2    10/2012    Liu
8,628,197 B2 *   1/2014    Estevez ................. G03B 21/10
                                                   353/119

(Continued)

FOREIGN PATENT DOCUMENTS

CN    102289252    12/2011
CN    102540655    7/2012
TW    M361059     7/2009

OTHER PUBLICATIONS

"Office Action of Taiwan Counterpart Application," dated Mar. 27, 2017, with English translation thereof, p. 1-p. 8, in which the listed references were cited.

*Primary Examiner* — Fred Tzeng
(74) *Attorney, Agent, or Firm* — JCIPRNET

(57) ABSTRACT

An electronic system, an electronic device and a method for setting an extending screen thereof, and a projector apparatus are provided. The method for setting the extending screen includes following steps. Whether at least one projector apparatus is connected to an electronic device is determined. Moreover, when the projector apparatus is connected to the electronic device, the projector apparatus is set as at least one extending screen extended out from the edge of the screen of the electronic device. The corresponding relationship between the extending screen and the screen is related to the location relationship between the connected projector apparatus and the screen of the electronic device.

20 Claims, 9 Drawing Sheets

(51) Int. Cl.
*G06F 3/14* (2006.01)
*G09G 5/14* (2006.01)
*G09G 5/38* (2006.01)
*G09G 5/00* (2006.01)
G03B 21/14 (2006.01)
G06F 3/0486 (2013.01)

(56) References Cited

U.S. PATENT DOCUMENTS

| | | | |
|---|---|---|---|
| 2008/0036691 A1* | 2/2008 | Yamada | G06F 3/1446 345/1.1 |
| 2008/0136973 A1* | 6/2008 | Park | G03B 29/00 348/744 |
| 2008/0231546 A1* | 9/2008 | Li | G06F 3/1423 345/3.4 |
| 2009/0046035 A1 | 2/2009 | Wen | |
| 2010/0067181 A1* | 3/2010 | Bair | G06F 1/1616 361/679.3 |
| 2010/0149071 A1* | 6/2010 | Son | G06F 1/1601 345/1.1 |
| 2010/0201630 A1 | 8/2010 | Yang | |
| 2011/0154249 A1* | 6/2011 | Jang | G06F 3/017 715/781 |
| 2012/0092309 A1* | 4/2012 | Jikuya | G03B 21/145 345/204 |
| 2014/0049493 A1* | 2/2014 | Nojima | G09G 5/006 345/173 |

\* cited by examiner ated out from the edge of can be automatically set according to the location relationship between the location of the connection port of the connected electronic device and the screen in the electronic device.

ELECTRONIC SYSTEM, ELECTRONIC DEVICE AND METHOD FOR SETTING EXTENDING SCREEN THEREOF, AND PROJECTOR APPARATUS

CROSS-REFERENCE TO RELATED APPLICATION

This application claims the priority benefit of Taiwan application serial no. 105133391, filed on Oct. 17, 2016. The entirety of the above-mentioned patent application is hereby incorporated by reference herein and made a part of this specification.

BACKGROUND OF THE INVENTION

Field of the Invention

The invention relates to an external screen technique of an electronic device, and more particularly, to an electronic system, an electronic device and a method for setting an extending screen thereof, and a projector apparatus.

Description of Related Art

In an electronic device, the size of the screen and the expansion possibilities of the external screen are generally among the most important features to a user. Although the size of the current consumer electronic device is desired to be compact, consumers still prefer a larger screen. Therefore, many manufacturers adopt external screens or projectors to extend the physical screens of electronic devices to meet user demand.

The current operating system generally also has built-in applications related to the setting of the extending screen and the operation of the extending screen. These built-in applications allow the user to set the locations of the external screens or the extending screens of the projectors. However, the projectors in the past have been large and heavy, and are therefore not portable. In addition, the connection ports of consumer electronic devices are generally located in the body, such that when a projector and a consumer electronic device are connected to each other, a very large space is needed for the placement of these apparatuses. Moreover, the user needs to put in additional effort to set the location of the extending screen of the projector in the consumer electronic device and adjust relevant display settings. As a result, the user is not motivated to carry the projector to increase the screen size of the consumer electronic device. Therefore, if the user is to be motivated to carry the projector, then in addition to reducing the size of the projector, how to improve the operating method between the consumer electronic device and the projector also needs to be considered.

SUMMARY OF THE INVENTION

The invention provides an electronic system, an electronic device and a method for setting an extending screen thereof, and a projector apparatus. When an external projector apparatus is connected to the electronic device, the edge of the screen from which the extending screen of the projector apparatus is extended out of can be automatically set according to the location relationship between the location of the connection port of the connected electronic device and the screen in the electronic device.

The method for setting an extending screen of an electronic device of the invention includes the following steps. Whether at least one projector apparatus is connected to the electronic device is determined. Moreover, when the at least one projector apparatus is connected to the electronic device, the at least one projector apparatus is set as at least one extending screen extended out from the edge of the screen of the electronic device. The corresponding relationship between the extending screen and the screen is related to the location relationship between the projector apparatus and the screen of the electronic device.

The projector apparatus of the invention includes a housing, a transmission port, a computing processor, and a projection lens. The transmission port is disposed on the housing to be selectively connected to the connection port on the electronic device. The computing processor is disposed in the housing and coupled to the transmission port. The projection lens is coupled to the computing processor. The computing processor projects an extending screen via the projection lens. When the transmission port is connected to the electronic device, the computing processor receives the content of the extending screen and displays the extending screen. The corresponding relationship between the extending screen and the screen is related to the location relationship between the physical location of the connected connection port on the electronic device and the screen of the electronic device.

The electronic device of the invention includes at least one connection port, a screen, and a processor. The at least one connection port is disposed on the housing surface of the electronic device. The processor is coupled to the connection port and the screen. The processor determines whether the projector apparatus is connected to the electronic device via the connection port. When the at least one projector apparatus is connected to the electronic device, the processor sets the projector apparatus as at least one extending screen extended out from the edge of the screen. The corresponding relationship between the extending screen and the screen is related to the location relationship between the physical location of the connected connection port on the electronic device and the screen of the electronic device.

Based on the above, the electronic system and the method for setting the extending screen of the electronic device of the invention can automatically set the corresponding relationship between the extending screen of the projector apparatus and the screen according to the location relationship between the location of the connection port of the connected electronic device and the screen of the electronic device. Since the location setting of the extending screen can be automatically set via the method of an embodiment of the invention, the user can use the external projector apparatus in a more intuitive and consistent manner without manually adjusting the corresponding relationship between the extending screen and the screen.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the embodiments of the invention, the external extending screen of an electronic device (such as a notebook computer, a tablet computer, an all-in-one PC; AIO) can be intuitively and consistently automatically set via a projector apparatus (such as a micro projector) and connection ports on the electronic device. In the following, the spirit of the invention is described via a plurality of embodiments.

Figure 1:
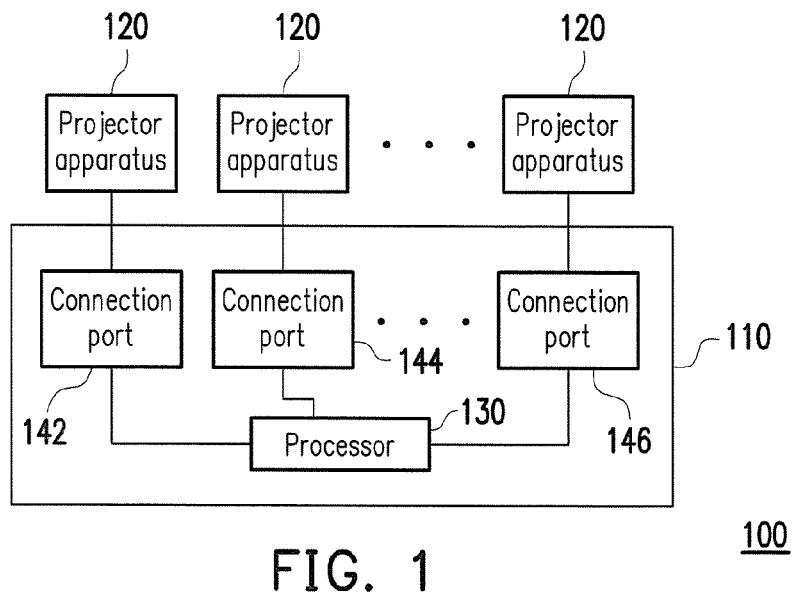
FIG. 1 is a function block diagram of an electronic system according to an embodiment of the invention.
Figure 2:
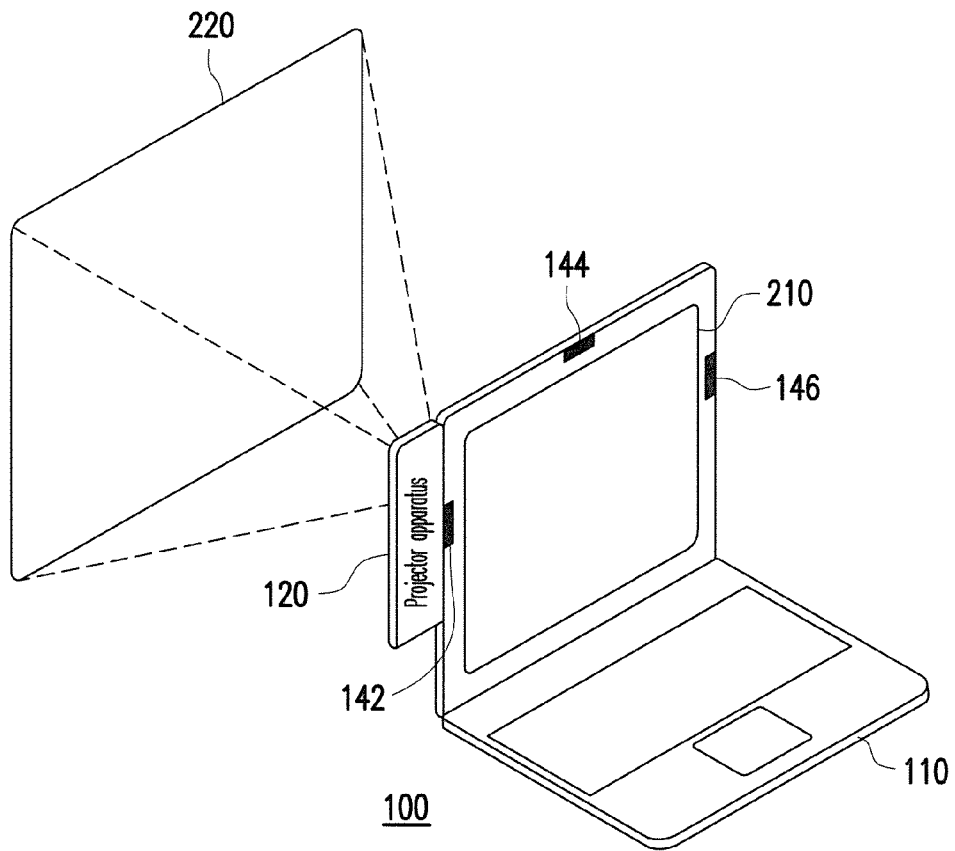
FIG. 2 is a schematic of an electronic system according to the first embodiment of the invention.

FIG. 1 is a function block diagram of an electronic system 100 according to an embodiment of the invention, and FIG. 2 is a schematic of an electronic system 100 according to the first embodiment of the invention. The electronic system 100 includes an electronic device 110 and at least one projector apparatus 120. FIG. 1 shows a plurality of projector apparatuses 120, and FIG. 2 only exemplarily shows a single projector apparatus 120. The electronic device 110 can include a processor 130 and at least one connection port. A plurality of connection ports is shown in FIG. 1 and FIG. 2, and connection ports 142, 144, and 146 are exemplarily described. It is assumed here that, the connection port 142 is located on the left side of a screen 210 of the electronic device 100, the connection port 144 is located at the top of the screen 210 of the electronic device 100, and the port 146 is located on the right side of the screen 210 of the electronic device 100. In FIG. 2, the projector apparatus 120 located on the left side of the electronic device 110 can project a projection screen 220. In the present embodiment, a processor 130 in the electronic device 110 can get the corresponding relationship of each of the connection ports located in the electronic device 110 via a preset memory unit (such as an EEPROM preset in the electronic device 110).

Figure 3:
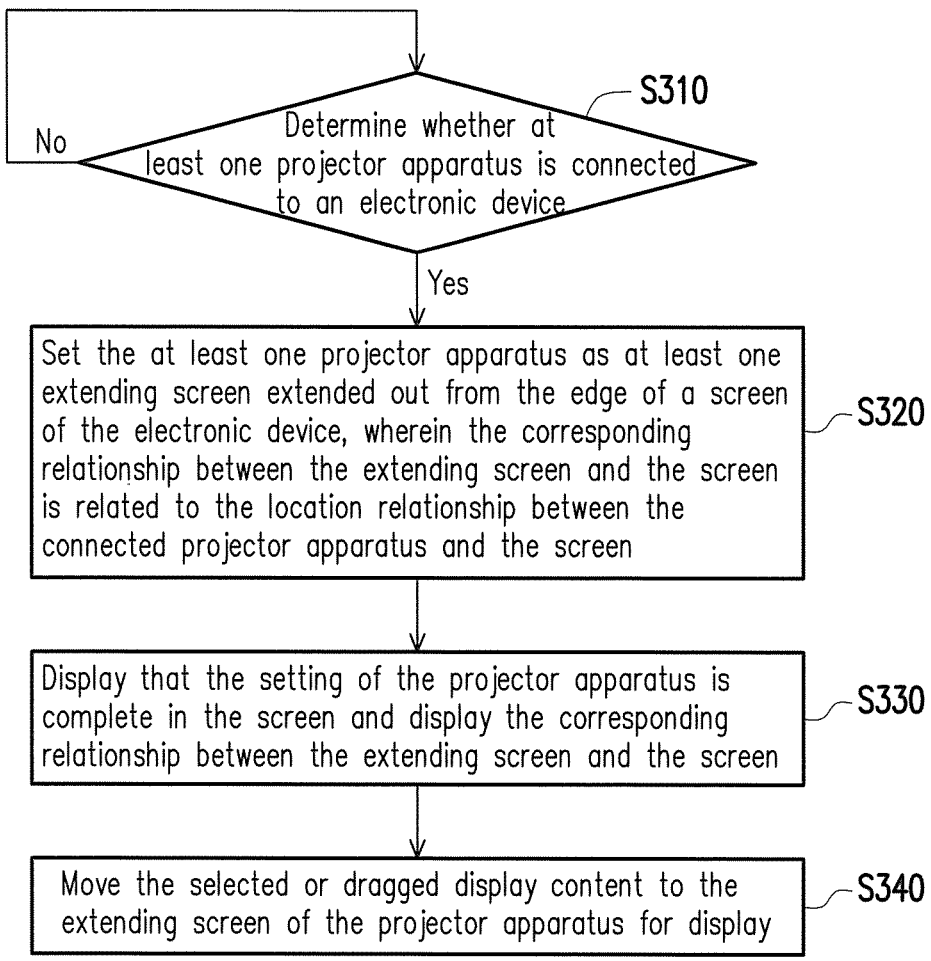
FIG. 3 is a flow chart of the method for setting the extending screen of an electronic device according to an embodiment of the invention.

FIG. 3 is a flow chart of the method for setting the extending screen of an electronic device according to an embodiment of the invention. The method for setting the extending screen can be applied in the electronic device 110 of FIG. 1 and FIG. 2, and can be implemented by a specific application (such as a micro projector management service program or a micro projector driver), and can also be implemented by a specific hardware or firmware, and the invention is not limited thereto. In the present embodiment, a specific application is executed mainly by the processor 130 to achieve the method for setting the extending screen. Referring to both FIG. 2 and FIG. 3, in step S310, the processor 130 in the electronic device 110 determines whether the projector apparatus 120 is connected to the electronic device 110. The projector apparatus 120 can be connected to the electronic device 110 via the connection ports (such as 142, 144, and 146) disposed on the housing surface of the electronic device 110.

When the projector apparatus 120 is connected to the electronic device 110 via a certain connection port, step S320 is performed after step S310, and the processor 130 in the electronic device 110 sets the projector apparatus 120 as the extending screen extended out from the edge of the screen 210 of the electronic device 110. It should be mentioned that, the processor also determines which connection port the projector apparatus 120 is connected to so as to show the corresponding relationship between the extending screen of the projector apparatus 120 and the screen 210 on the electronic device 110, which is related to the location relationship between the connection port to which the projector apparatus 120 is connected to and the screen.

Figure 4:
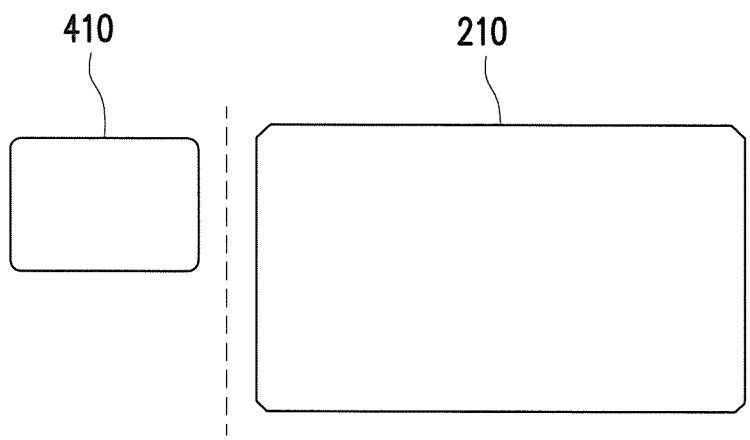
FIG. 4 is a schematic of the screen and the extending screen of the projector apparatus in FIG. 2.

FIG. 4 is a schematic of the screen 210 and an extending screen 410 of the projector apparatus in FIG. 2. Using FIG. 2 and FIG. 4 as examples, when the projector apparatus 120 is connected to the electronic device 110 via the connection port 142, since the processor learned the connection port 142 is located on the left side of the screen 210 of the electronic device 110, the processor sets the projector apparatus 120 as the extending screen 410 extended out from the edge on the "left side" of the screen 210 of the electronic device 110, as shown in FIG. 4. In other words, the corresponding relationship between the extending screen 410 and the screen 210 (the extending screen 410 extended out from the edge on the left side of the screen 210) is related to the location relationship between the connected projector apparatus 120 and the screen 210 of the electronic device (the connection port 142 is located on the left side of the screen 210).

In other embodiments of the invention, if the projector apparatus 120 is connected to the electronic device 110 via the connection port 144, then the processor sets the extending screen to be extended out from the edge at the top of the screen 210; and if the projector apparatus 120 is connected to the electronic device 110 via the connection port 146, then the processor sets the extending screen to be extended out from the edge on the right side of the screen 210. In other words, the processor decides which edge of the screen the extending screen is extended out from according to the location relationship between the physical location of the connected connection port on the electronic device 110 and the screen 210 of the electronic device 110.

Referring further to FIG. 2 and FIG. 3, in step S330, the processor displays that the setting of the connected projector apparatus 120 is complete on the screen 210, and displays the corresponding relationship between the extending screen 410 and the screen 210 (such as displaying the extending screen 410 is extended from the edge on the left side of the screen 210). Accordingly, in step S340, the user can move the selected or dragged display content (such as a graphical application window) to the extending screen (such as the extending screen 410 of FIG. 4) of the projector apparatus 120 and display the display content on the projection screen 220.

Figure 5:
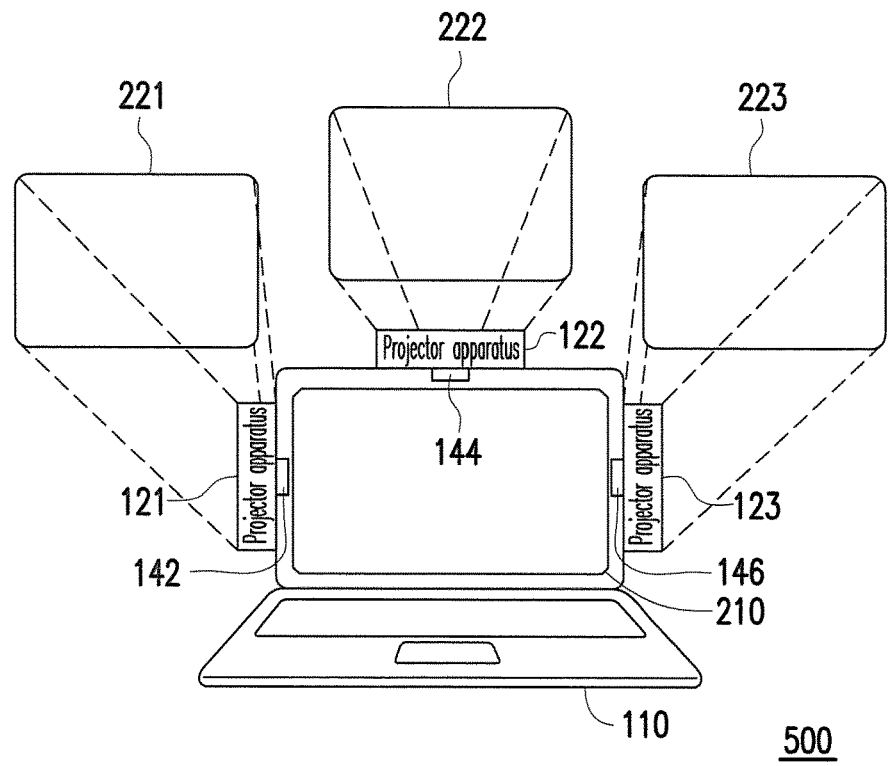
FIG. 5 is a schematic of an electronic system according to the second embodiment of the invention.
Figure 6:
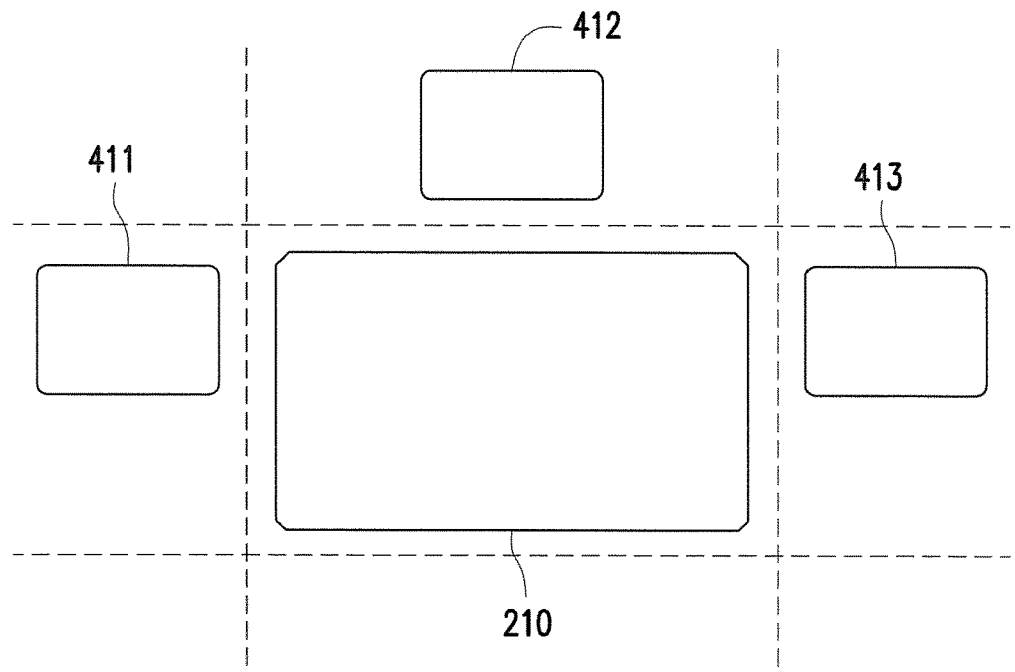
FIG. 6 is a schematic of the screen and the extending screen of the projector apparatus in FIG. 5.

FIG. 5 is a schematic of an electronic system 500 according to the second embodiment of the invention. In FIG. 5, the electronic system 500 includes three projector apparatuses 121 to 123. The projector apparatus 121 is selectively and electrically connected to the connection port 142 on the left side of the housing of the screen 210 of the electronic device 110, the projector apparatus 122 is selectively and electrically connected to the connection port 144 at the top of the housing of the screen 210 of the electronic device 110, and the projector apparatus 123 is selectively and electrically connected to the connection port 146 on the right side of the housing of the screen 210 of the electronic device 110. The projector apparatuses 121 to 123 respectively project projection screens 221, 222, and 223. FIG. 6 is a schematic of the screen 210 and extending screens 411 to 413 of the projector apparatus in FIG. 5. Based on the method for setting the extending screen of FIG. 3, the extending screen 411 corresponding to the projector apparatus 121 is extended out from the edge on the left side of the screen 210, the extending screen 412 corresponding to the projector apparatus 122 is extended out from the edge at the top of the screen 210, and the extending screen 413 corresponding to the projector apparatus 123 is extended out from the edge on the right side of the screen 210.

Figure 7:
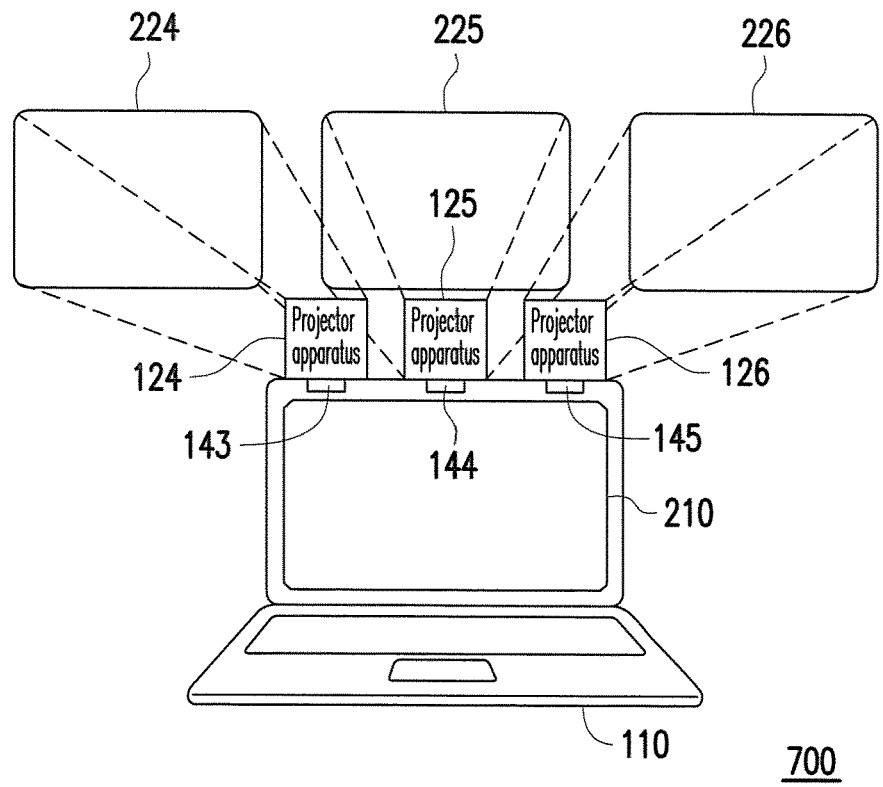
FIG. 7 is a schematic of an electronic system according to the third embodiment of the invention.
Figure 8:
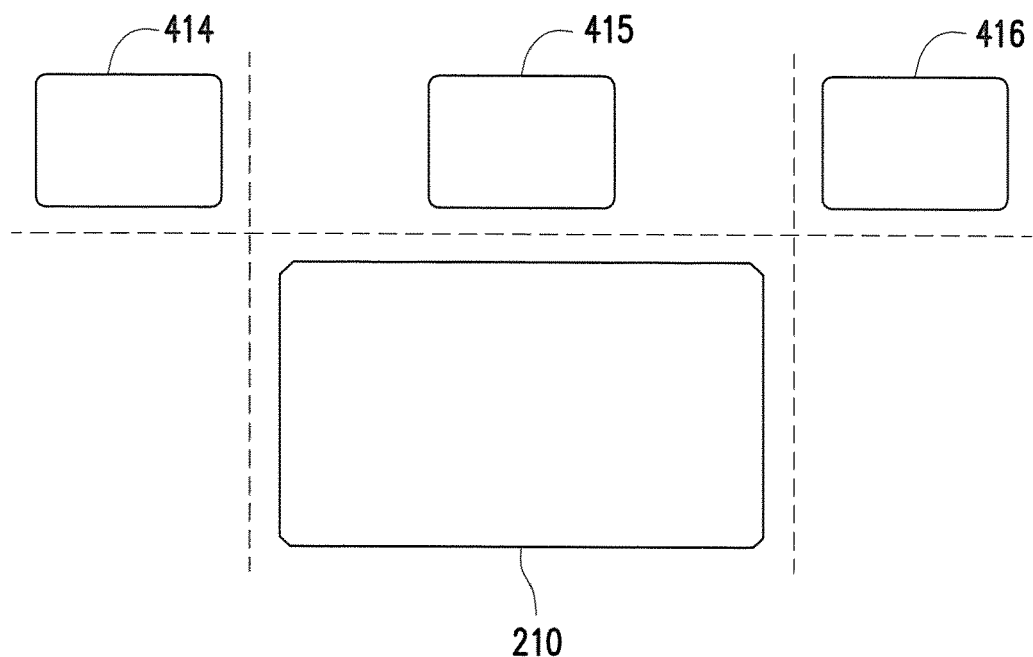
FIG. 8 is a schematic of the screen and the extending screen of the projector apparatus in FIG. 7.

FIG. 7 is a schematic of an electronic system 700 according to the third embodiment of the invention. In FIG. 7, the electronic system 700 includes three projector apparatuses 124 to 126. The projector apparatus 124 is selectively and electrically connected to the connection port 143 towards the left at the top of the housing of the screen 210 of the electronic device 110, the projector apparatus 125 is selectively and electrically connected to the connection port 144 in the middle at the top of the housing of the screen 210 of the electronic device 110, and the projector apparatus 126 is selectively and electrically connected to the connection port 145 towards the right at the top of the housing of the screen 210 of the electronic device 110. The projector apparatuses 124 to 126 respectively project projection screens 224, 225, and 226. FIG. 8 is a schematic of the screen 210 and extending screens 414 to 416 of the projector apparatuses 124 to 126 in FIG. 7. Based on the method for setting the extending screen of FIG. 3, the extending screen 414 corresponding to the projector apparatus 124 is extended out from the upper left corner of the screen 210, the extending screen 415 corresponding to the projector apparatus 125 is extended out from the edge at the top of the screen 210, and the extending screen 416 corresponding to the projector apparatus 126 is extended out from the upper right corner of the screen 210.

It can be known from FIG. 2, FIG. 5, and FIG. 7 that, a plurality of connection ports (such as the connection ports 142, 143, 144, 145, and 146) can be provided on the housing surface of the electronic device 110 to support a plurality of external projector apparatuses. In some embodiments, two or more than two connection ports can also be disposed on the left side or the right side of the housing surface of the electronic device 110, such that the electronic device 110 can support more external projector apparatuses at the same time.

Figure 9:
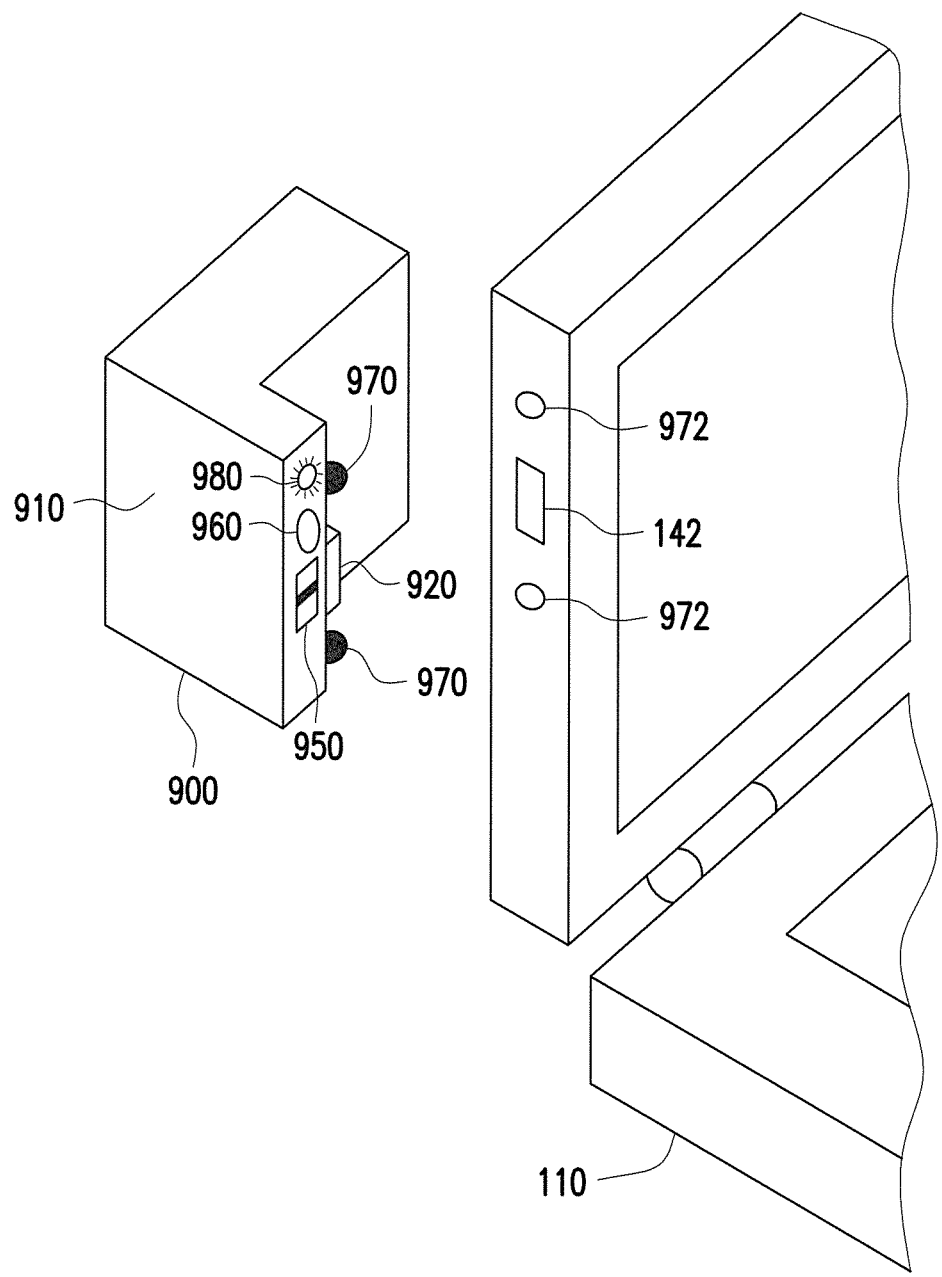
FIG. 9, FIG. 10, and FIG. 11 are schematics of a projector apparatus according to an embodiment of the invention.
Figure 10:
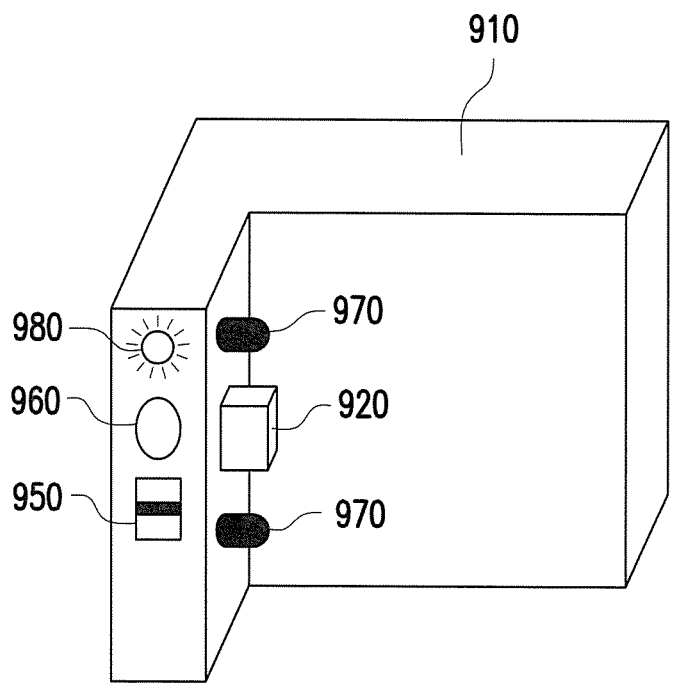
Figure 11:
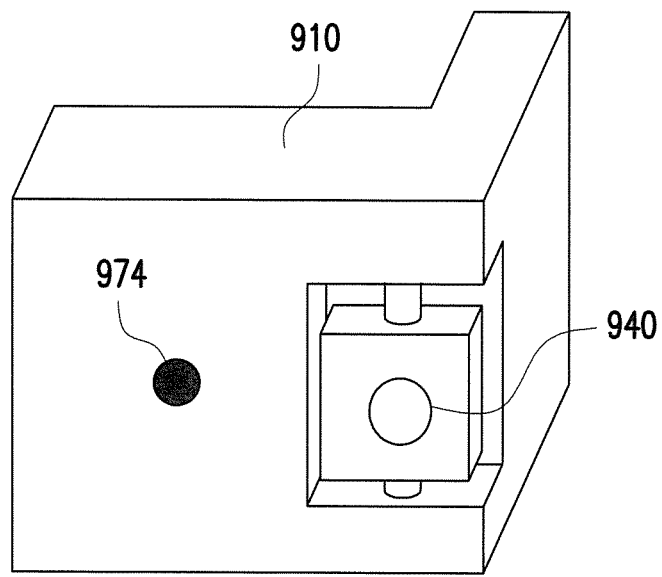
Figure 12:
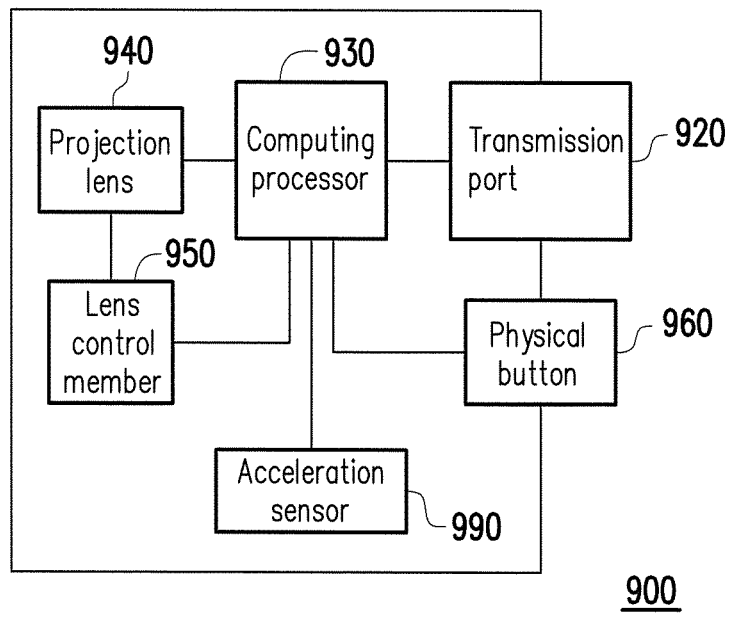
FIG. 12 is a block diagram of a projector apparatus according to an embodiment of the invention.

FIG. 9, FIG. 10, and FIG. 11 are schematics of a projector apparatus 900 according to an embodiment of the invention. FIG. 12 is a block diagram of a projector apparatus 900 according to an embodiment of the invention. The projector apparatus 900 mainly includes a housing 910, a transmission port 920, a computing processor 930, and a projection lens 940. The transmission port 920 is disposed on the housing of the projector apparatus 900 to be selectively and electrically connected to the connection port (such as the connection port 142) on the electronic device 110. The projection lens 940 is coupled to the computing processor 930. The computing processor 930 can project an extending screen via the projection lens 940. The housing 910 of the present embodiment has an L shape such that the housing 910 can be closely combined with the electronic device 110. The projector apparatus 900 further includes one or a plurality of fasteners 970, and the electronic device 110 may have fasteners 972 corresponding to the fasteners 970. The main function of the fasteners 970 and 972 is to fix the projector apparatus 900 on the electronic device 110. The fasteners 970 and 972 can be magnetic apparatuses or rubber anti-slip objects. The housing 910 of FIG. 11 further has a screw hole position 974, and the user can screw a tripod in the screw hole position to support or fix the projector apparatus 900.

In FIG. 9, FIG. 10, and FIG. 12, the projector apparatus 900 further includes a lens control member 950. The lens control member 950 is electrically connected to the projection lens 940. The user can adjust or fine tune the projection angle of the projection lens 940 via the lens control member 950. The lens control member 950 of the present embodiment can be implemented by a mechanical control member or an electronic control member. The mechanical lens control member 950 can be implemented by a lever or a roller, and the electronic lens control member 950 can further be implemented by a virtual control lever on the window user interface. Moreover, the projector apparatus 900 further includes a physical button 960 and an acceleration sensor 990.

In the present embodiment, the user can plug the projector apparatus 900 into one of the plurality of connection ports of the electronic device 110 as needed and does not need to purchase different types of the projector apparatus 900 specifically for different connection ports. In other words, the projector apparatus 900 can achieve the function of a multi-purpose machine, and the function of plug and play can be achieved by arbitrarily plugging any of the connection ports on the electronic device 110 based on user needs. Since the projector apparatus 900 of an embodiment of the invention can be plugged into the connection port 142, 144, or 146 of the electronic device 110 of FIG. 2 and the projector apparatus 900 causes the body thereof to rotate 180 degrees when the connection port 142 or 146 is plugged in, the projection direction needs to be corrected to project correctly. Therefore, the computing processor 930 in the present embodiment can provide the acceleration data of the acceleration sensor 990 in the projector apparatus 900 to the processor in the electronic device. Accordingly, the electronic device can determine the placement direction of the projector apparatus 900 via the acceleration sensor 990 in the projector apparatus 900 such that a projection direction of the projector apparatus 900 is corrected corresponding to the placement direction. In another embodiment, the processor in the electronic device 110 determines the placement direction of the projector apparatus via the physical location of the connection port plugged into the projector apparatus 900 to correct the projection direction thereof.

Figure 13:
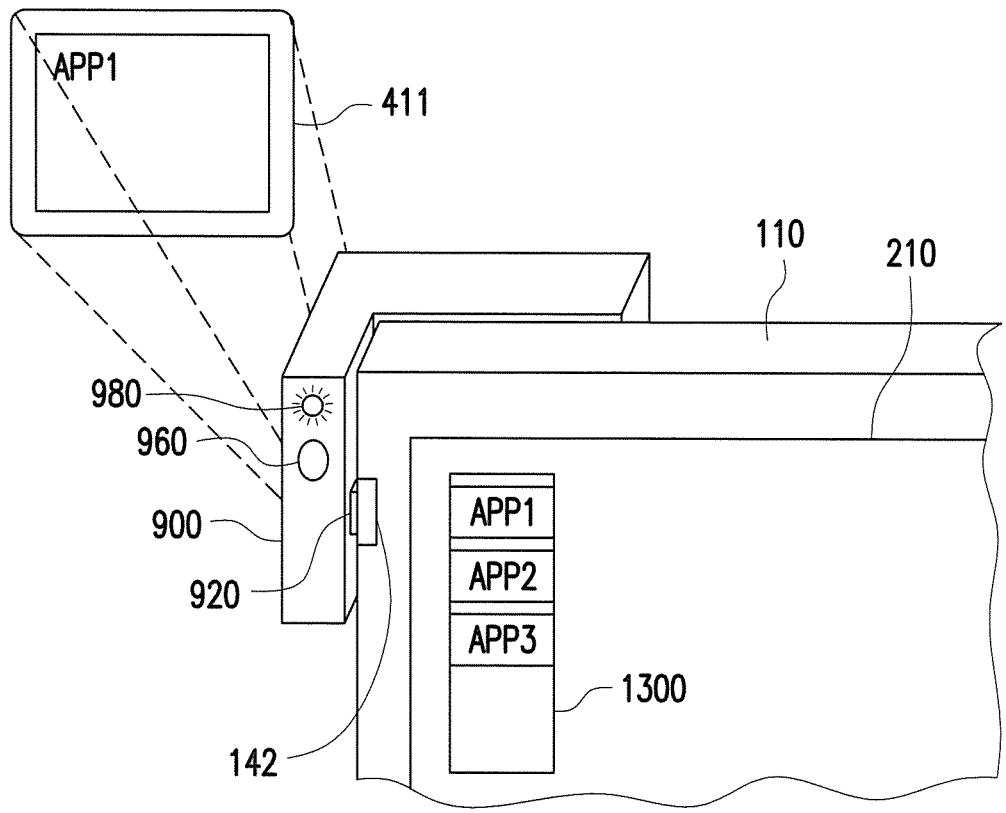
FIG. 13 is a function schematic diagram of a projector apparatus.

FIG. 13 is a function schematic diagram of the projector apparatus 900. Here, the physical button 960 on the projector apparatus 900 and functions relating to the user interface are described via FIG. 13. When the user connects the projector apparatus 900 to the electronic device 110, the screen 210 displays a window user interface 1300 adjacent to the edge of the screen 210 nearby the projector apparatus 900 (i.e., the edge on the left side of the screen 210 corresponding to the projector apparatus 900). The window user interface 1300 includes at least one window application identifier, such as a plurality of window application identifiers APP1 to APP3 shown in FIG. 13. In the present embodiment, the user can first select one specific window application (such as the window application APP1) in the operating system of the electronic device 110 and then press the physical button 960 as the specific operation. Accordingly, the computing processor 930 in the projector apparatus 900 rapidly moves the selected display content (the window application APP1) to the extending screen 411 of the projector apparatus 900 and displays the content of the window application APP1, such that the user can rapidly show the desired content and processor 130 display the window application identifier APP1 in the window user interface 1300. In other words, the window user interface 1300 located on the left side of the screen 210 is an application pop-up window shown for the projector apparatus corresponding to the extending screen 411, and since the extending screen 411 is located on the left side of the screen 210, the window user interface 1300 is also displayed at a location close to the left side of the screen 210. Similarly, referring to FIG. 6, if the physical button on the projector apparatus corresponding to the extending screen 412 is pressed, then one window user interface corresponding to the extending screen 412 appears at the location close to the top of the screen 210 as the application pop-up window, and the user can also move the selected window application to the extending screen 412 via the above method and generate a window application identifier of the selected window application to be shown in the window user interface corresponding to the extending screen 412.

Moreover, referring further to FIG. 13, when the application identifiers APP1 to APP3 of the window user interface 1300 are selected, the extending screen 411 of the projector apparatus displays the content corresponding to the selected application identifiers. In other words, if the current extending screen 411 is displaying the content of the window application identifier APP1 and the user wants the content of the window application identifier APP2 instead, then the user can directly click the window application identifier APP2 in the window user interface 1300, and the extending screen 411 displays the content of the window application identifier APP2 instead. Accordingly, the window user interface 1300 allows the user to more conveniently switch the display content in the extending screen 411.

Figure 14:
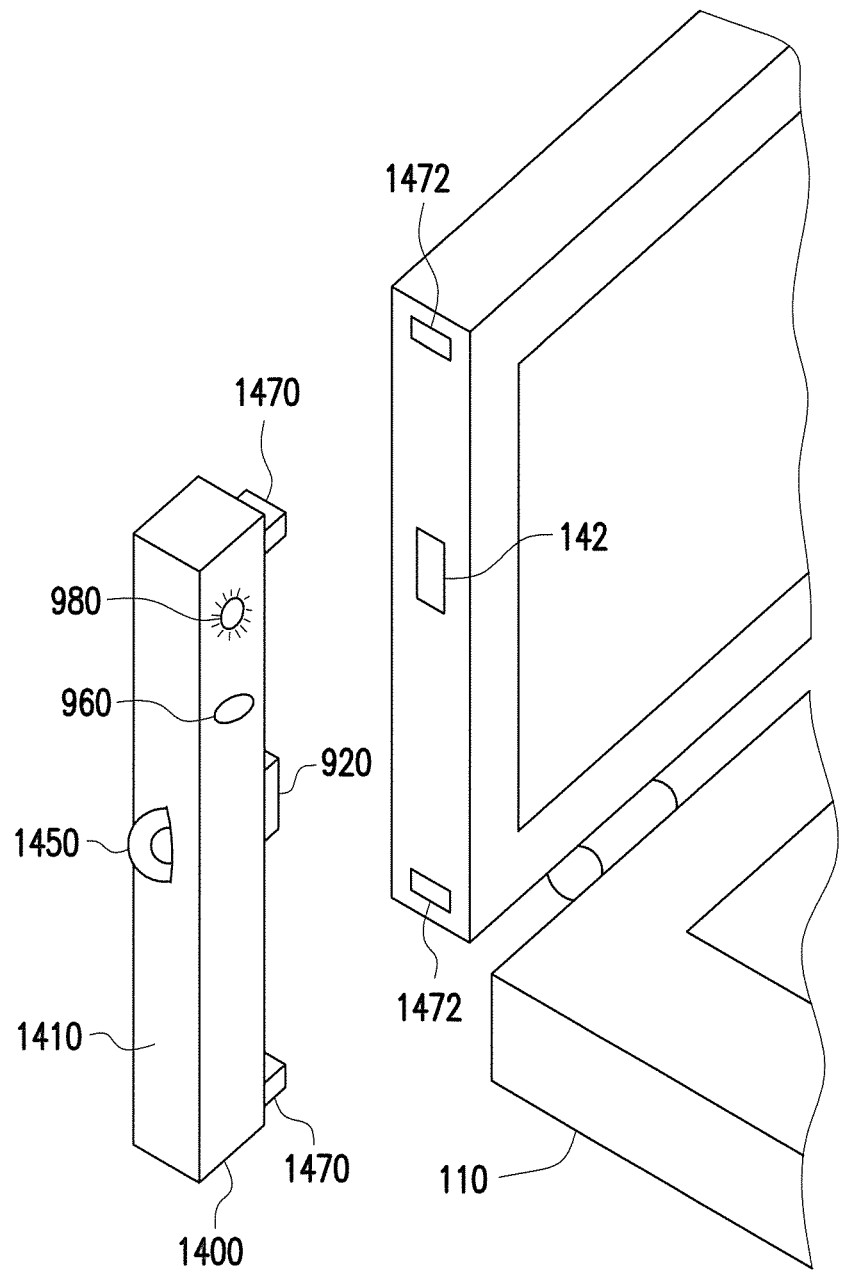
FIG. 14 and FIG. 15 are schematics of a projector apparatus according to another embodiment of the invention.
Figure 15:
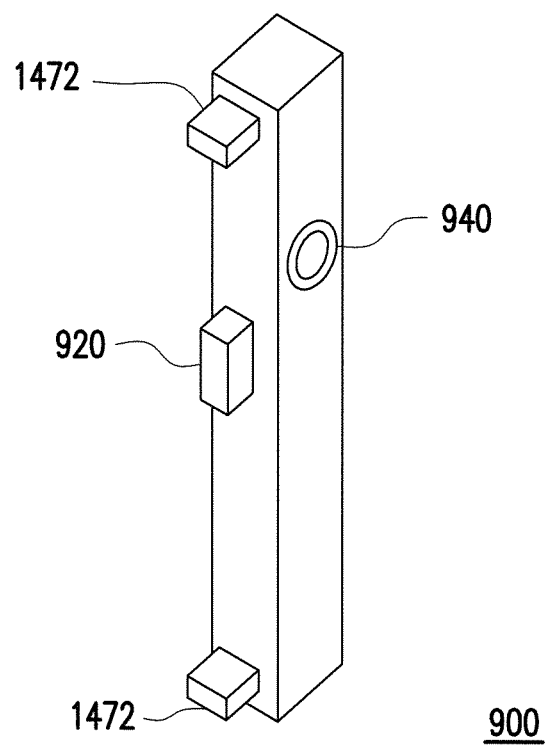

FIG. 14 and FIG. 15 are schematics of a projector apparatus 1400 according to another embodiment of the invention. The projector apparatus 1400 in FIG. 14 and FIG. 15 is similar to the projector apparatus 900 of FIGS. 9 to 12, and the main differences are that a housing 1410 of the projector apparatus 1400 is a strip; a lens control member 1450 of the projector apparatus 1400 is implemented by a roller; and fasteners 1470 and 1472 are shown as plugs. In some of the embodiments, a prompt light 980 as shown in FIG. 9, FIG. 10, FIG. 13, and FIG. 14 can further be disposed on the housing of the projector apparatus facing the user. The function of the prompt light 980 includes that, when the projector apparatus is connected to one of the connection ports of the electronic devices, the prompt light 980 is lit, or the color of the prompt light 980 is changed to a first color (such as orange) to indicate that the projector apparatus 900 is connected to the electronic device 110. Moreover, when the physical button 960 in FIG. 9, FIG. 10, and FIG. 13 is pressed, the prompt light 980 is changed to show a second color (such as blue) such that the user learns the specific operation of "pressing the physical button 960" is complete, so as to rapidly display the selected display content in the projector apparatus 900 for which the prompt light 980 is showing the second color.

Based on the above, the electronic system and the method for setting the extending screen of the electronic device of the invention can automatically set the corresponding relationship between the extending screen of the projector apparatus and the screen according to the location relationship between the physical location of the connection port of the connected electronic device and the screen of the electronic device. Since the location setting of the extending screen can be automatically set via the method of an embodiment of the invention, the user can use an external projector apparatus in a more intuitive and consistent manner without manually adjusting the corresponding relationship between the extending screen and the screen of the electronic device.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A method for setting an extending screen of an electronic device, comprising:
   determining whether at least one projector apparatus is connected to the electronic device; and
   setting the at least one projector apparatus as at least one extending screen extended out from an edge of a screen of the electronic device when the at least one projector apparatus is connected to the electronic device,
   wherein a corresponding relationship between a first screen image presented on the extending screen and a second screen image presented on the screen of the electronic device is related to a location relationship between the at least one connected projector apparatus and the screen of the electronic device,
   wherein the projector apparatus is disposed on the screen of the electronic device.

2. The method for setting the extending screen of claim 1, wherein the electronic device comprises at least one connection port disposed on a housing surface of the electronic device, and
   the step of determining whether the at least one projector apparatus is connected to the electronic device comprises:
   determining whether the at least one projector apparatus is connected to the at least one connection port, and
   the corresponding relationship between the extending screen and the screen is related to a location relationship between a physical location of the at least one connected connection port on the electronic device and the screen of the electronic device.

3. The method for setting the extending screen of claim 1, further comprising:
   displaying that a setting of the at least one projector apparatus is complete on the screen, and displaying the corresponding relationship between the extending screen and the screen.

4. The method for setting the extending screen of claim 1, further comprising:
   determining a placement direction of the at least one projector apparatus via an acceleration sensor in the at least one projector apparatus such that a projection direction of the at least one projector apparatus is corrected corresponding to the placement direction.

5. The method for setting the extending screen of claim 1, further comprising:

determining a placement direction of the at least one projector apparatus according to a physical location of at least one connection port connected to the at least one projector apparatus on the electronic device to correct a projection direction of the at least one projector apparatus.

6. The method for setting the extending screen of claim 1, wherein the at least one projector apparatus comprises a physical button, wherein when the at least one projector apparatus is connected to the electronic device and the physical button is pressed, the electronic device moves a selected display content to the at least one extending screen of the at least one projector apparatus for display.

7. The method for setting the extending screen of claim 1, wherein a window user interface is displayed adjacent to the edge of the screen corresponding to the at least one projector apparatus, wherein the window user interface comprises at least one application identifier, and when the at least one application identifier is selected, a content corresponding to the selected application identifier is displayed on the at least one extending screen of the at least one projector apparatus.

8. A projector apparatus, comprising:
a housing;
a transmission port disposed on the housing to be selectively connected to at least one connection port on an electronic device;
a computing processor disposed in the housing and coupled to the transmission port; and
a projection lens coupled to the computing processor, wherein the computing processor projects an extending screen via the projection lens,
wherein when the transmission port is connected to the electronic device, the computing processor receives a content of the extending screen and displays the extending screen,
wherein a corresponding relationship between a first screen image presented on the extending screen and a second screen image presented on a screen of the electronic device is related to a location relationship between a physical location of the at least one connected connection port on the electronic device and the screen of the electronic device,
wherein the connection port is disposed on the screen of the electronic device.

9. The projector apparatus of claim 8, further comprising:
a physical button,
wherein when the projector apparatus is connected to the electronic device and the physical button is pressed, the electronic device moves a selected display content to the extending screen of the projector apparatus for display.

10. The projector apparatus of claim 9, further comprising:
a prompt light, wherein when the projector apparatus is connected to the at least one connection port, the prompt light is lit or a color of the prompt light is changed to a first color to indicate that the projector apparatus is connected to the electronic device,
and, when the physical button s pressed, the prompt light changes the color of the prompt light to a second color.

11. The projector apparatus of claim 8, further comprising:
at least one fastener fixing the projector apparatus on the electronic device.

12. The projector apparatus of claim 8, further comprising:

a lens control member adjusting or fine tuning a projection angle of the projection lens.

13. The projector apparatus of claim 8, wherein the housing of the projector apparatus is L-shaped or a strip.

14. The projector apparatus of claim 8, further comprising:
an acceleration sensor determining a placement direction of the projector apparatus such that a projection direction of the projector apparatus is corrected corresponding to the placement direction.

15. An electronic device, comprising:
at least one connection port disposed on a housing surface of the electronic device;
a screen; and
a processor coupled to the at least one connection port and the screen,
wherein the processor determines whether at least one projector apparatus is connected to the electronic device via the at least one connection port, and when the at least one projector apparatus is connected to the electronic device, the processor sets the at least one projector apparatus as at least one extending screen extended out from an edge of the screen,
wherein a corresponding relationship between a first screen image presented on the at least one extending screen and a second screen image presented on the screen of the electronic device is related to a location relationship between a physical location of the at least one connected connection port on the electronic device and the screen of the electronic device,
wherein the connection port is disposed on the screen of the electronic device.

16. The electronic device of claim 15, wherein after the at least one projector apparatus is connected to the electronic device determined by the processor, the screen displays that a setting of the at least one projector apparatus is complete, and displays the corresponding relationship between the at least one extending screen and the screen.

17. The electronic device of claim 15, wherein the processor determines a placement direction of the at least one projector apparatus via an acceleration sensor in the at least one projector apparatus such that a projection direction of the at least one projector apparatus is corrected corresponding to the placement direction.

18. The electronic device of claim 15, wherein the processor determines a placement direction of the at least one projector apparatus according to the physical location of the at least one connection port connected to the at least one projector apparatus on the electronic device to correct a projection direction of the at least one projector apparatus.

19. The electronic device of claim 15, wherein the processor displays a window user interface adjacent to the edge of the screen corresponding to the at least one projector apparatus, wherein the window user interface comprises at least one application identifier, and when the at least one application identifier is selected, the processor displays a content corresponding to the selected application identifier on the at least one extending screen of the at least one projector apparatus.

20. The electronic device of claim 15, wherein the at least one projector apparatus comprises:
a physical button,
wherein when the at least one projector apparatus is connected to the electronic device and the physical button is pressed, the processor moves the selected display content to the at least one extending screen of the at least one projector apparatus for display.

* * * * *